(12) United States Patent
Guglielmino et al.

(10) Patent No.: US 12,721,469 B2
(45) Date of Patent: Sep. 1, 2026

(54) ULTRASONIC CLEANER DEVICE FOR AN ESPRESSO COFFEE MACHINE AND ESPRESSO COFFEE MACHINE INCORPORATING SUCH A CLEANER DEVICE

(71) Applicant: LA MARZOCCO S.R.L., Scarperia (IT)

(72) Inventors: Scott Guglielmino, Scarperia (IT); Aric Forbing, Scarperia (IT)

(73) Assignee: LA MARZOCCO S.R.L., Scarperia (IT)

( * ) Notice: Subject to any disclaimer, the term of this patent is extended or adjusted under 35 U.S.C. 154(b) by 821 days.

(21) Appl. No.: 17/422,904

(22) PCT Filed: Jan. 22, 2020

(86) PCT No.: PCT/EP2020/051464
§ 371 (c)(1),
(2) Date: Jul. 14, 2021

(87) PCT Pub. No.: WO2020/152199
PCT Pub. Date: Jul. 30, 2020

(65) Prior Publication Data

US 2022/0061586 A1 Mar. 3, 2022

(30) Foreign Application Priority Data

Jan. 22, 2019 (IT) ........................ 102019000000913

(51) Int. Cl.
*A47J 31/60* (2006.01)
*B08B 3/12* (2006.01)

(52) U.S. Cl.
CPC ................ *A47J 31/60* (2013.01); *B08B 3/12* (2013.01)

(58) Field of Classification Search
CPC . A47J 31/60; A47J 31/44; A47L 15/13; B08B 3/12; A61C 17/16
See application file for complete search history.

(56) References Cited

U.S. PATENT DOCUMENTS 3,987,715 A * 10/1976 Muller ................. A47J 31/401 99/275
4,967,648 A 11/1990 Helbling
(Continued)

FOREIGN PATENT DOCUMENTS

AU 2015100960 9/2015
CA 2962617 A1 4/2016
(Continued)

OTHER PUBLICATIONS

What's a Transducer APC International Ltd. https://web.archive.org/web/20120712214734/https://www.americanpiezo.com/piezo-theory/whats-a-transducer.html Pertinent pp. 1-2 (Year: 2012).*
(Continued)

*Primary Examiner* — Edward F Landrum
*Assistant Examiner* — Theodore J Evangelista
(74) *Attorney, Agent, or Firm* — NIXON & VANDERHYE P.C.

(57) ABSTRACT

An ultrasonic cleaner device (6) for an espresso coffee machine (100) comprising a dispensing group (15), wherein the ultrasonic cleaner device (6) comprises: a liquid reservoir (61), a piezoelectric transducer (62) and a generator (63), wherein the generator (63) is configured to produce an electronic signal of high frequency and send it to the piezoelectric transducer (62) so that the piezoelectric transducer (62) receives the signal and responds by changing shape as long as the electronic signal is applied, wherein said
(Continued)

ultrasonic cleaner device (6) comprises a body (66) which is adapted to connect in a releasable manner, to the dispensing group (15).

16 Claims, 6 Drawing Sheets

(56) References Cited

U.S. PATENT DOCUMENTS 5,133,983 A 7/1992 Greiwe
5,239,519 A 8/1993 Nelson
5,259,297 A 11/1993 Guiliano
5,372,061 A 12/1994 Albert
5,462,236 A 10/1995 Knepler
5,555,791 A 9/1996 McNeill et al.
5,870,943 A 2/1999 Levi
6,058,986 A 5/2000 Bethuy
6,067,894 A 5/2000 Eugster
6,085,637 A 7/2000 Fukushima
6,155,158 A 12/2000 Anson
6,164,189 A 12/2000 Anson
6,459,854 B1 10/2002 Yoakim et al.
6,550,370 B2 4/2003 Dam
6,611,660 B1 8/2003 Sagal
7,461,585 B2 12/2008 Nenov
8,215,229 B2 7/2012 Faccinti
8,272,319 B2 9/2012 Jarisch
8,663,724 B1 3/2014 Banasik
8,696,899 B2 4/2014 Roulin
8,850,956 B2 10/2014 Bianchi et al.
8,850,959 B2 10/2014 Banchi et al.
8,857,318 B2 10/2014 Zhong
8,895,095 B2 11/2014 Star et al.
9,125,519 B2 9/2015 Goeltenboth et al.
9,578,986 B2 2/2017 Ceotto et al.
9,986,870 B2 6/2018 Reyhanloo
10,602,874 B2 3/2020 Cable
10,638,875 B2* 5/2020 Senger .................. B60T 13/662
10,687,660 B2 6/2020 Gatti et al.
10,881,242 B2 1/2021 Dionisio et al.
11,103,104 B2 8/2021 Bakke et al.
11,122,927 B2 9/2021 Bianchi et al.
2004/0079237 A1 4/2004 Denisart
2004/0244599 A1 12/2004 Wei
2005/0011364 A1 1/2005 Chen et al.
2006/0037481 A1 2/2006 Bicht
2006/0150821 A1 7/2006 Paul
2006/0278093 A1 12/2006 Biderman et al.
2006/0283329 A1 12/2006 Ronci
2007/0051247 A1 3/2007 Felty
2007/0193452 A1 8/2007 Campetella et al.
2007/0227363 A1 10/2007 Verna
2007/0277676 A1 12/2007 Crivellin
2008/0190297 A1 8/2008 Gussmann
2009/0095165 A1 4/2009 Nosler
2009/0114099 A1 5/2009 Gotlenboth
2009/0205502 A1 8/2009 Carbonini
2010/0003022 A1 1/2010 Reyhanloo
2010/0005971 A1 1/2010 Faccinti
2010/0018407 A1 1/2010 Liu
2010/0112165 A1 5/2010 Masciandaro et al.
2010/0229728 A1 9/2010 Kiefer et al.
2010/0233337 A1 9/2010 Aigner
2010/0263543 A1 10/2010 Krauchi
2010/0282090 A1 11/2010 Etter
2010/0300299 A1 12/2010 Epars et al.
2011/0005398 A1 1/2011 Garcia
2011/0042408 A1 2/2011 Giordano
2011/0048243 A1 3/2011 Bambi
2011/0117259 A1 5/2011 Storek
2012/0017767 A1 1/2012 Samso Besora
2012/0090474 A1 4/2012 Carbonini
2012/0118164 A1 5/2012 Tonelli et al.
2012/0121780 A1 5/2012 Lai et al.
2012/0156344 A1* 6/2012 Studor .................. A47J 31/521
426/433
2012/0171332 A1 7/2012 Lai
2012/0222666 A1 9/2012 Morgandi
2013/0098249 A1 4/2013 Fidler et al.
2013/0330453 A1 12/2013 Doglioni Majer
2014/0117040 A1 5/2014 May
2014/0137746 A1 5/2014 Moran et al.
2014/0314921 A1 10/2014 Kuempel et al.
2014/0352543 A1 12/2014 Boni
2016/0249763 A1 9/2016 Llopis
2017/0119195 A1 5/2017 Al-Sahibani
2018/0055275 A1 3/2018 Bianchi et al.
2018/0271319 A1 9/2018 Gatti et al.
2018/0303284 A1 10/2018 Gatti et al.
2018/0360257 A1 12/2018 Dionisio et al.
2019/0075964 A1 3/2019 Della Pietra et al.
2019/0313841 A1* 10/2019 Quinn ....................... B08B 3/12
2019/0335945 A1* 11/2019 Senger .................. B60T 13/745
2020/0060453 A1* 2/2020 Wang ................. B65D 51/1688
2020/0093323 A1 3/2020 Dionisio et al.
2020/0237137 A1 7/2020 Bakke et al.
2021/0204748 A1 7/2021 Della Pietra et al.

FOREIGN PATENT DOCUMENTS

CN 1424886 A 6/2003
CN 101229019 A 7/2008
CN 101600377 A 12/2009
CN 100588354 C 2/2010
CN 201401779 Y 2/2010
CN 202122062 U 1/2012
CN 202179442 U 4/2012
CN 102595984 A 7/2012
CN 102761565 10/2012
CN 102858211 A 1/2013
CN 103118574 A 5/2013
CN 203 122 128 8/2013
CN 103391734 A 11/2013
CN 104080379 A 10/2014
CN 104619218 A 5/2015
CN 105640339 A 6/2016
CN 106073509 A 11/2016
CN 108464695 A 8/2018
CN 208211915 U 12/2018
DE 29 19 110 11/1980
DE 10 2011 116 913 A1 9/2012
DE 10 2013 107077 1/2015
EP 0 838 185 4/1998
EP 1 034 729 9/2000
EP 1 688 072 B1 8/2006
EP 1 747 736 1/2007
EP 1 886 604 A1 2/2008
EP 2 044 869 A1 4/2009
EP 2 218 374 A2 8/2010
EP 2 314 182 4/2011
EP 2 316 796 5/2011
EP 2 490 580 8/2012
EP 2 490 578 9/2013
EP 2 644 066 10/2013
EP 2 701 563 3/2014
EP 2 789 276 10/2014
EP 3 042 591 7/2016
EP 3 064 099 9/2016
EP 3 167 782 5/2017
EP 3 225 141 10/2017
EP 3 329 815 6/2018
FR 1 174 038 3/1959
FR 1 449 310 8/1966
FR 2 901 681 12/2007
GB 726 272 3/1955
GB 728 476 4/1955
JP 2004-534562 A 11/2004
JP 2005-040605 A 2/2005
JP 2009-537260 A 10/2009
JP 2012-035040 A 2/2012
JP 2014-506820 A 3/2014
JP 2015-518381 A 7/2015
JP 2015-144714 A 8/2015

(56) References Cited

FOREIGN PATENT DOCUMENTS

| | | | | |
|---|---|---|---|---|
| PL | 228860 B1 * | 5/2018 | | |
| WO | WO 2006/082064 | 8/2006 | | |
| WO | 1 898 758 B1 | 11/2006 | | |
| WO | WO 2008/114210 | 9/2008 | | |
| WO | WO 2009/010190 | 1/2009 | | |
| WO | WO 2010/113116 | 10/2010 | | |
| WO | WO 2011/055189 | 5/2011 | | |
| WO | WO 2011/095926 | 8/2011 | | |
| WO | WO 2011/140582 | 11/2011 | | |
| WO | WO 2012/138327 A1 | 10/2012 | | |
| WO | WO 2012/146641 A1 | 11/2012 | | |
| WO | WO 2013/112732 | 8/2013 | | |
| WO | WO 2013/121438 | 8/2013 | | |
| WO | WO 2014/177925 | 11/2014 | | |
| WO | WO 2014/187110 A1 | 11/2014 | | |
| WO | WO 2014/207281 | 12/2014 | | |
| WO | WO 2015/006244 A1 | 1/2015 | | |
| WO | WO 2015/055342 A1 | 4/2015 | | |
| WO | WO 2015/055557 | 4/2015 | | |
| WO | WO 2016/057568 | 4/2016 | | |
| WO | WO 2016/093920 | 6/2016 | | |
| WO | WO 2017/009186 | 1/2017 | | |
| WO | WO 2017/009189 | 1/2017 | | |
| WO | WO 2017/068021 | 4/2017 | | |
| WO | WO-2017067854 A1 * | 4/2017 | .......... | A47J 31/3671 |
| WO | 2018/115876 | 6/2018 | | |
| WO | WO 2018/219878 | 12/2018 | | |
| WO | WO-2019074448 A2 * | 4/2019 | ............. | A47J 31/60 |

OTHER PUBLICATIONS

International Search Report for PCT/EP2020/051464, mailed Apr. 21, 2020, 4 pages.
Written Opinion of the ISA for PCT/EP2020/051464, mailed Apr. 21, 2020, 6 pages.
U.S. Appl. No. 17/289,093, filed Apr. 27, 2021, entitled "Espresso Coffee Machine With Adjustment of the Dispensing Pressure and Method for Adjusting the Dispensing Pressure of an Espresso Coffee Machine".
U.S. Appl. No. 17/286,133, filed Apr. 16, 2021, entitled "Active System for Monitoring and Filtering the Water for an Espresso Coffee Machine and Associated Espresso Coffee Machine".
U.S. Appl. No. 17/421,548, filed Jul. 8, 2021, entitled "Coffee Grinding Machine Configured to Provide a Dose of Stratified Ground Coffee and Associated Method".
U.S. Appl. No. 17/428,128, filed Aug. 3, 2021, entitled "Coffee Grinding Machine With Improved Dosing System and Associated Method".
U.S. Appl. No. 17/428,181, filed Aug. 3, 2021, entitled "Coffee Grinding Machine Configured to Provide Different Particle Size Profiles and Associated Method".
International Search Report for PCT/EP2016/066181, mailed Oct. 5, 2016, 3 pages.
International Search Report for PCT/EP2016/074726, mailed Jan. 31, 2017, 2 pages.
International Search Report for PCT/EP2016/075182 mailed Feb. 23, 2017, 4 pages.
Written Opinion of the ISA for PCT/EP2016/075182 mailed Feb. 23, 2017, 5 pages.
English Translation for CN 102761565 published Oct. 2012.
English translation of JP Office Action mailed Jun. 8, 2021 in JP application 2018-517145.
International Search Report for PCT/EP2016/066186, mailed Aug. 12, 2016, 3 pages.
Office Action mailed Dec. 10, 2019 in U.S. Appl. 15/739,856.
International Search Report for PCT/EP2017/052213, mailed May 4, 2017, 3 pages.
International Search Report and Written Opinion mailed Jun. 9, 2016, issued in PCT/EP2016/053894.
International Search Report for PCT/IB2018/051865, mailed Jul. 2, 2018, 3 pages.
Written Opinion of the ISA for PCT/IB2018/051865, mailed Jul. 2, 2018, 5 pages.
Chinese Office Action and English translation mailed Mar. 31, 2021 in Chinese Application 201880018668.5.
Yingile et al, "Optimal Tuning of Temperature Control Parameters for Post-Mixed Beverage Machines Based on Changes in Thermal Load", Computer Technology and Automation, vol. 30, Issue 1, Mar. 15, 2011, pp. 33-38.
International Search Report for PCT/EP2019/079672 mailed Dec. 18, 2019, 3 pages.
Written Opinion of the ISA for PCT/EP2019/079672 mailed Dec. 18, 2019, 5 pages.
Blake, B., and S. Callendar, "Barista Tips and Techniques: Brew Ratios Around the World," Oct. 24, 2014, Newsletter, La Marzocco, Seattle, Wash., <https://home.lamarzoccousa.com/brew-ratios-around-world/> [retrieved Jun. 3, 2015], 10 pages.
International Search Report and Written Opinion mailed Jun. 15, 2015, issued in corresponding International Application PCT/IB2015/051903, filed Mar. 16, 2015, 10 pages.
Paul, "Weighing Espresso—How It Works," Nov. 16, 2010, Blog, Marco Beverage Systems U.S., Seattle, Wash., <http://marcobeveragesystems.com/us/weighing-espresso-how-it-works/> [retrieved Jun. 3, 2015], 1 page.
International Search Report for PCT/IB2019/054750, mailed Aug. 13, 2019, 4 pages.
Written Opinion of the ISA for PCT/IB/2019/057750, mailed Aug. 13, 2019, 5 pages.
International Search Report for PCT/EP2019/080559, mailed Feb. 11, 2020, 5 pages.
Written Opinion of the ISA for PCT/EP2019/080559, mailed Feb. 11, 2020, 5 pages.
International Search Report for PCT/IB2020/050905 mailed Aug. 4, 2020, 3 pages.
Written Opinion of the ISA for PCT/IB2020/050905 mailed Aug. 4, 2020, 5 pages.
International Search Report for PCT/IB2020/050907 dated Apr. 6, 2020, 4 pages.
Written Opinion of the ISA for PCT/IB2020/050907 dated Apr. 6, 2020, 6 pages.
Chinese Office Action dated Nov. 29, 2022 issued in Chinese Patent Application No. 202080009807.5 and English translation, 13 pp.

* cited by examiner 631
63
6
65
661
66
62
68

631
63
65
68
68
661
61
611
66
6

ULTRASONIC CLEANER DEVICE FOR AN ESPRESSO COFFEE MACHINE AND ESPRESSO COFFEE MACHINE INCORPORATING SUCH A CLEANER DEVICE

This application is the U.S. national phase of International Application No. PCT/EP2020/051464 filed 22 Jan. 2020, which designated the U.S. and claims priority to IT Patent Application No. 102019000000913 filed 22 Jan. 2019, the entire contents of each of which are hereby incorporated by reference.

BACKGROUND

The present invention relates to the sector of beverage dispensing machines, in particular to the sector of espresso coffee machines. Even more particularly, it relates to cleaning of the coffee dispensing system. Still more in particular, the present invention relates to an ultrasonic cleaner device for an espresso coffee machine and to an espresso coffee machine configured to use such an ultrasonic cleaner device.

STATE OF THE ART

Typically, an espresso coffee machine comprises one or more dispensing groups. The machine is configured to cause pressurized heated water to pass through a puck of coffee powder contained for example in a filter basket supported by a filter holder which is typically designed as portafilter. The portafilter is open at the bottom and has a single or double spout from which the beverage flows out. The beverage is collected inside a container, for example a cup.

More precisely, in an espresso coffee machine of the known type, hot water (for example heated in a boiler or the like) reaches a diffuser screw via a special duct. The diffuser screw allows the diffusion of the hot water over a so-called shower screen and consequently allows hot water to flow down through the underlying puck of coffee powder. The flow of hot water through the aforementioned components continues for the entire duration of dispensing of the beverage.

Once dispensing has been terminated, the fluid remaining above the coffee puck and partly that contained inside it, owing to the difference in pressure between the preparation chamber and discharging chamber, reverses its direction and rises back up to the system up to a discharge well.

The shower screen is substantially in the form of a disk which is suitably perforated so as to allow the uniform flow of hot water towards the coffee puck during dispensing and, at the same time, to prevent the particles of coffee powder from rising back up at the end of dispensing owing to the pressure difference.

The shower screen and some other components of the dispensing path which are passed through during the dispensing of espresso coffee are typically cleaned on a regular basis. In other words, the barista generally performs cleaning operations at least every day, at the end of the working time.

Typically, a standard cleaning cycle performed by a barista is carried out through a blank filter basket, namely a filter basket with no holes, mounted in a substantially standard portafilter. A specific cleaning substance is loaded in the blank filter basket. The portafilter with blank filter basket and cleaning substance is inserted into (attached to) the dispensing group to be cleaned and finally the barista starts a plurality of delivery cycles. After each delivery cycle (generally of few seconds), the machine remains in a rest state for allowing the cleaning substance to act on the components to be cleaned.

WO 2018/115876 A1 discloses a fluid conduit cleaning apparatus and method.

SUMMARY

The Applicant has realized that the above mentioned standard procedure for cleaning parts and components which are involved in the dispensing of an espresso coffee takes a considerable amount of time. The risk is that the barista does not complete all the cleaning cycles recommended by the machine manufacturer and/or reduces the duration of cleaning cycles for saving time. All those actions result in a decrease of efficiency of the machine with corresponding reduction of performance and quality of coffee which is prepared.

The Applicant has also realized that the above mentioned standard cleaning procedure, disadvantageously, results in a considerable waste of water, which is against principles of green economy and planet sustainability.

Similarly, with the standard cleaning procedure, it is always necessary to use an aggressive cleaning substance. Use of such a substance might alter the taste of the espresso coffee and in any case constitutes a threat for the planet because the substance is wasted together with the water.

The Applicant has faced the above problems in an attempt to find a solution to the above problems.

In particular, the Applicant has faced the problem of providing a cleaner device and a method for cleaning components of an espresso coffee machine which are involved in the dispensing of an espresso coffee. Such components include dispensing group parts such as diffuser screw, shower screen, brew group, flow restrictor, solenoid valve, as well as other components that make (or can make) contact with coffee residue during the use of the espresso machine. A further component which might be subject to a cleaning process is the brewing and discharging pipe. A further component which might be subject to a cleaning process is the solenoid valve connected to the coffee boiler. According to the Applicant, cleaning of dispensing group parts can be profitably carried out through use of ultrasound technology.

Depending on the power of the ultrasonic transducer used, the cleaning could potentially affect components before the valve.

It should be clear that the cleaner device and the cleaning method according to the present invention can be used on other components of the coffee machine, for instance for removing limescale or the like. This could be accomplished by placing the transducer in different areas of the machine, for instance on (or close to) the boilers.

According to a first aspect, the present invention provides an ultrasonic cleaner device for an espresso coffee machine comprising a dispensing group (or a plurality of dispensing groups),

- wherein the ultrasonic cleaner device comprises: a liquid reservoir, a piezoelectric transducer and a generator,
- wherein the generator is configured to produce an electronic signal of high frequency and send it to the piezoelectric transducer so that the piezoelectric transducer receives the signal and responds by changing shape as long as the electronic signal is applied,
- wherein said ultrasonic cleaner device comprises a body which is adapted to connect, in a releasable manner, to the dispensing group.

According to embodiments, the body comprises outwardly directed projections for connecting to the dispensing group.

According to embodiments, the outwardly directed projections are configured to cooperate with a circular guide or with a linear guide at a lower face of the dispensing group.

According to embodiments, the outwardly directed projections are in the form of ears which are arranged diametrally opposed from each other and are shaped with a decreasing thickness or with a substantially constant thickness.

According to embodiments, the generator is embodied in the device.

According to embodiments, the generator is remote from said device and it is connected to said piezoelectric transducer.

According to embodiments, the ultrasonic cleaner device further comprises a handle connected to the body.

According to embodiments, the ultrasonic cleaner device further comprises a battery for powering the generator.

According to embodiments, the battery is housed, at least partially, in the handle.

According to embodiments, the liquid reservoir is supported by the body which is hollow and connected to said handle.

According to a second aspect, the present invention provides an espresso coffee machine comprising one or more dispensing groups and an ultrasonic cleaner device as set forth above.

According to a third aspect, the present invention provides a method of cleaning a part of a coffee machine comprising one or more dispensing groups, the method comprising:

- providing a liquid reservoir, a piezoelectric transducer and a generator,
- loading said reservoir with a liquid;
- incorporating at least said liquid reservoir and said piezoelectric transducer into an ultrasonic cleaner device;
- connecting said ultrasonic cleaner device to the dispensing group of the coffee machine;
- producing an electronic signal of high frequency by said generator;
- sending the electronic signal to the piezoelectric transducer so that the piezoelectric transducer receives the signal and responds by changing shape; and
- maintaining the piezoelectric transducer fed with said electronic signal for a set cleaning cycle.

According to embodiments, the coffee machine part is a component which is involved in the dispensing of an espresso coffee, including one component selected from the group consisting of: a diffuser screw, a shower screen, a brew group, a flow restrictor, a dispensing group solenoid valve and a brewing pipe.

According to embodiments, connecting said ultrasonic cleaner device to the dispensing group of the coffee machine comprises screwing the ultrasonic cleaner device to the dispensing group or sliding the ultrasonic cleaner device into slides of the dispensing group.

According to embodiments, connecting said ultrasonic cleaner device to the dispensing group of the coffee machine comprises hanging the ultrasonic cleaner device using a handle.

Advantageously, the cleaner device and the cleaning method according to the present invention could make it possible to use more complicated components in the brew group (or, more generally, in the coffee machine) that cannot be currently used due to the difficulty to clean them.

BRIEF DESCRIPTION OF DRAWINGS

The present invention will be further described below with reference to the attached figures in which.

DETAILED DESCRIPTION

The description below, for the sake of convenience, refers in particular to an espresso coffee machine. Espresso is typically prepared by forcing hot water through ground and roasted coffee beans. The hot water absorbs oils and essences as it is forced through, typically under high pressure, creating a differential pressure across the ground coffee beans. However, the present invention is applicable to machines for dispensing other beverages. For example, instead of coffee powder, barley powder or other cereal powder may be used. Therefore, the expression "espresso coffee machine" must be understood as comprising also machines for preparing other beverages, provided that the preparation is carried out through a pressurized percolation process.

Figure 1:
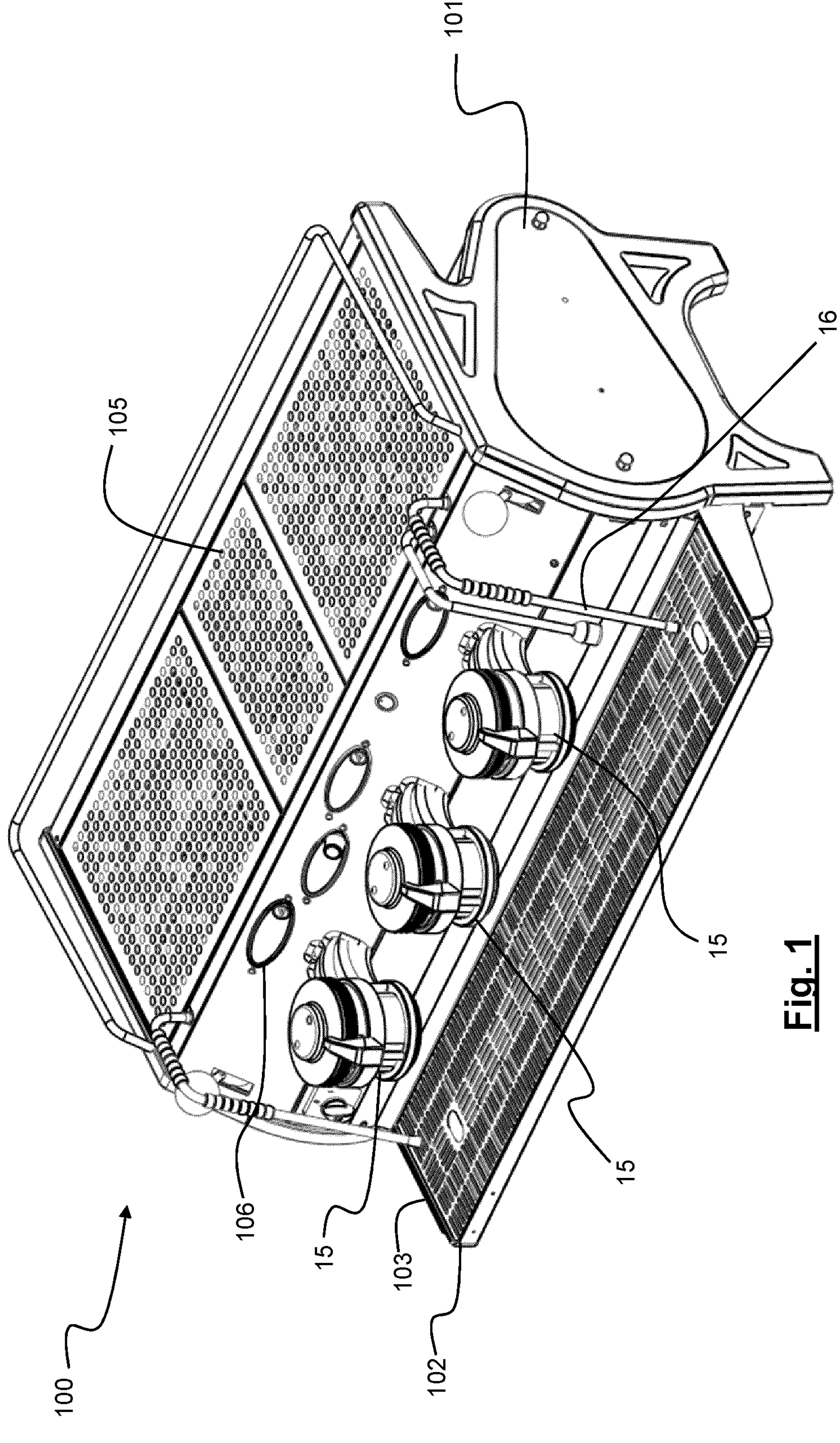
FIG. 1 shows a known espresso coffee machine in which the present invention can be implemented.

FIG. 1 shows a known espresso coffee machine which can make use of the cleaner device according to the present invention.

The espresso coffee machine 100 of FIG. 1 comprises a substantially closed main body 101 which contains most of the machine components. Some few components will be described later with reference to FIG. 2. The exemplifying machine 100 of FIG. 1 comprises three dispensing groups 15 configured to engage, in a releasing manner, with corresponding portafilters (filter holders) which are not shown in FIG. 1. The number of dispensing groups 15 could be different. A drip tray 102, partially closed by a grid 103 or the like may be present under the dispensing groups 15. Typically, the cups for collecting the espresso coffee during the preparation are supported by the grid 103 of the drip tray 102. The machine 100 may comprise an upper surface 105, generally heated, for the cups. The machine 100 may also comprise buttons, levers or other actuation means for switching the machine on or off and/or for starting brewing of an espresso coffee shot. The machine may also comprise one or more displays 106 for showing relevant parameters and information, including one or more of weight, time, pressure, flow, number of cycles, error codes.

However, the present invention is applicable to other types of machines, for instance to automatic or semi-automatic machines or to piston machines.

Figure 2:
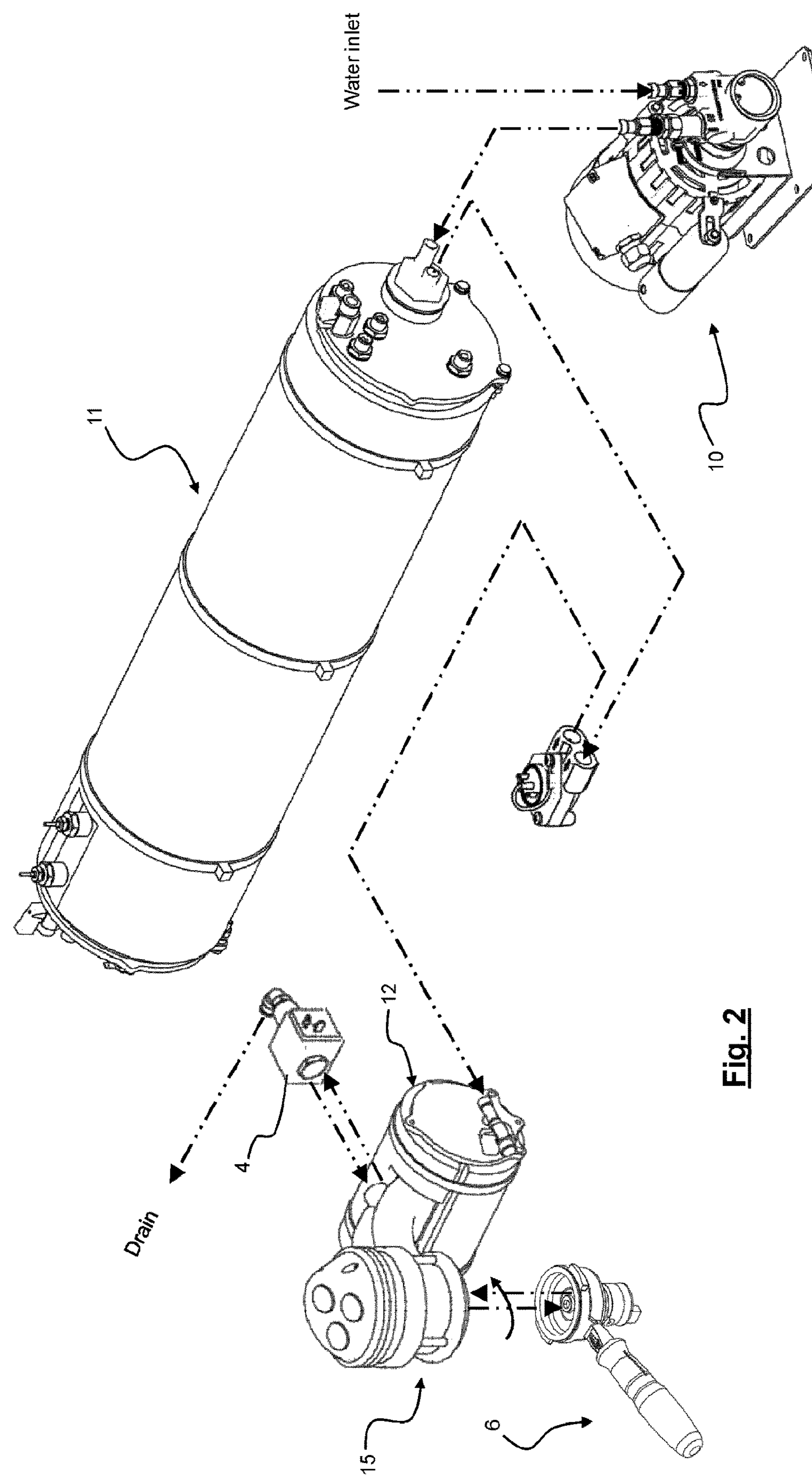
FIG. 2 shows, in schematic form, the hydraulic circuit and some components of a machine for preparing and dispensing espresso coffee, as well as an ultrasonic cleaner device according to an embodiment of the invention incorporated into a modified filter holder.

FIG. 2 shows, in schematic form, the hydraulic circuit and some components of a machine for preparing and dispensing espresso coffee. Several components, which are not relevant for the purposes of understanding of the invention, are not shown and/or will not described in detail. The machine of FIGS. 1 and 2 is only an example because the present invention is equally applicable to machines having a different scheme.

With reference to the diagram shown in FIG. 2, the machine comprises a pump 10 which receives water. Typically, the pump 10 receives water which is not heated. Typically the pump 10 receives cold water from a mains water pipe and conveys said cold water under pressure to the components downstream thereof. The water which is output from the pump 10 has a temperature of about 20° C. or in any case at room temperature. The temperature of the water which passes through the pump 10 is typically influenced by the room temperature and in any case by the external temperature.

Water from the pump 10 is at least partially sent to a steam boiler 11 provided with an associated valve body. Water in the steam boiler 11 is heated to form steam. The heated water from the steam boiler 11 is at least partially sent to a coffee boiler 12 connected to a dispensing group (or dispensing unit) 15. As said above, the dispensing group 15 is commonly configured to connect, in a releasable manner, with a filter holder (portafilter) carrying a filter basket.

Preferably, each dispensing group is provided with a separate coffee boiler.

Also shown in FIG. 2 is a three-way solenoid group valve 4 which receives hot water at the brewing temperature from the coffee boiler 12 and either feeds the dispensing group 15 through a brewing pipe or drains excess water to a discharge well.

The steam boiler is configured to feed a steam wand 16 (FIG. 1) preferably provided with a decompression valve.

Figure 3:
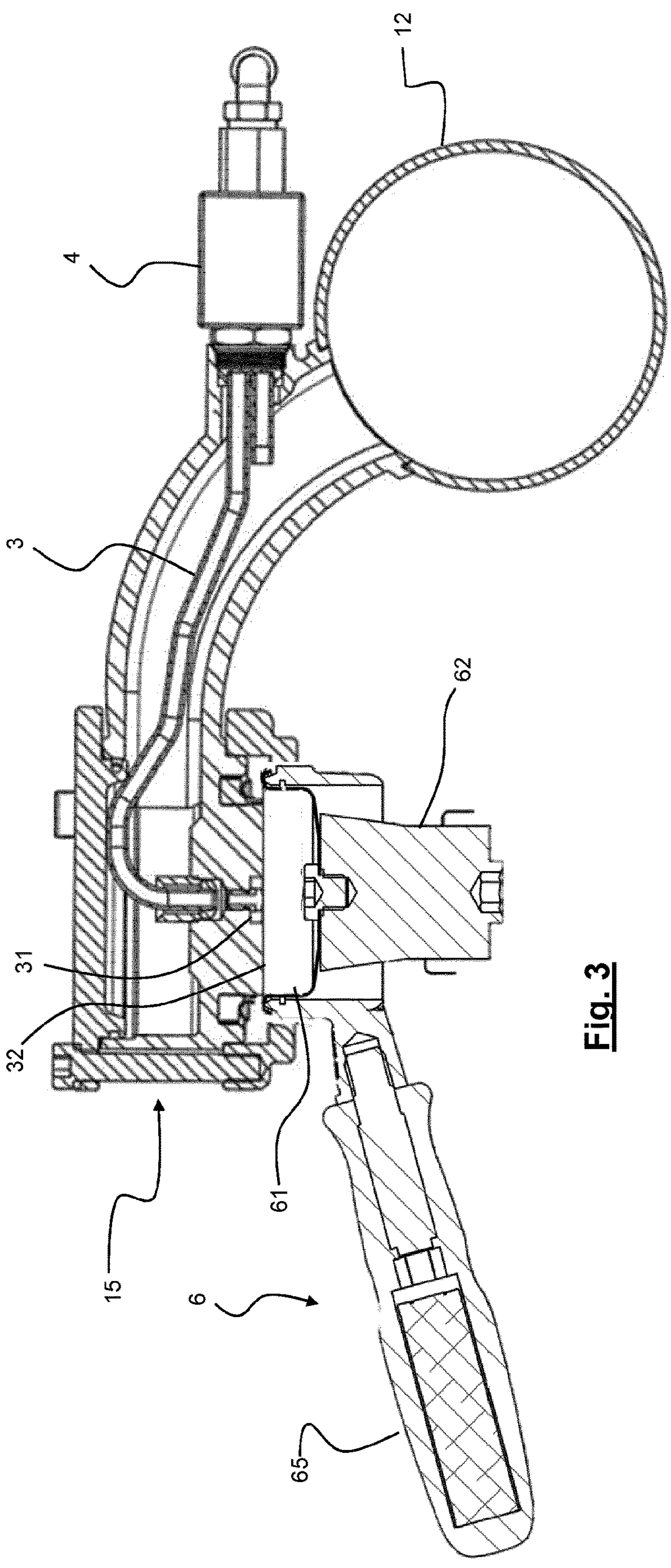
FIG. 3 shows, in a schematic cross-section, a coffee boiler, a dispensing group and a first embodiment of an ultrasonic cleaner device embodied at least partially in a modified portafilter for an espresso coffee machine.

FIG. 3 shows a schematic cross-section of a coffee boiler 12, a dispensing group 15 and a modified portafilter 6 partially incorporating the present invention and configured to connect with the dispensing 15 group 15. Reference number 4 designates the above mentioned threeway solenoid group valve while reference number 3 designates the above mentioned brewing pipe which connects the solenoid valve 4 (which in turn receives hot pressurized water from the coffee boiler) to the diffuser screw 31 and finally to the shower screen 32 which allows 20 the diffusion of the hot water in a puck of coffee. The three-way solenoid group valve 4 may comprise a valve of the type 31A31A1V15T3BDV230AY manufactured by ODE s.r.l. Societa Unipersonale, Calico, Italy.

As it is known, piezoelectric transducers have a property of changing size almost instantly when excited by an electrical signal. When excited the transducer increases in size and causes the top of the device to move. This creates a compression wave in liquid in a reservoir. By using an electrical generator that puts out a high frequency signal, from 20 to 250 KHz, the transducer rapidly induces compression and rarefaction waves in the liquid.

During the rarefaction cycle the liquid is torn apart. This creates vacuum cavities within the liquid. These cavities will grow larger and smaller as the compression waves are continued. When the cavity reaches a certain size (based on the frequency and the signal power) the cavity can no longer retain its shape. The cavity collapses violently and creates a jet of plasma that impacts against whatever object is in the reservoir.

Figures 4A, 4B, 4C:
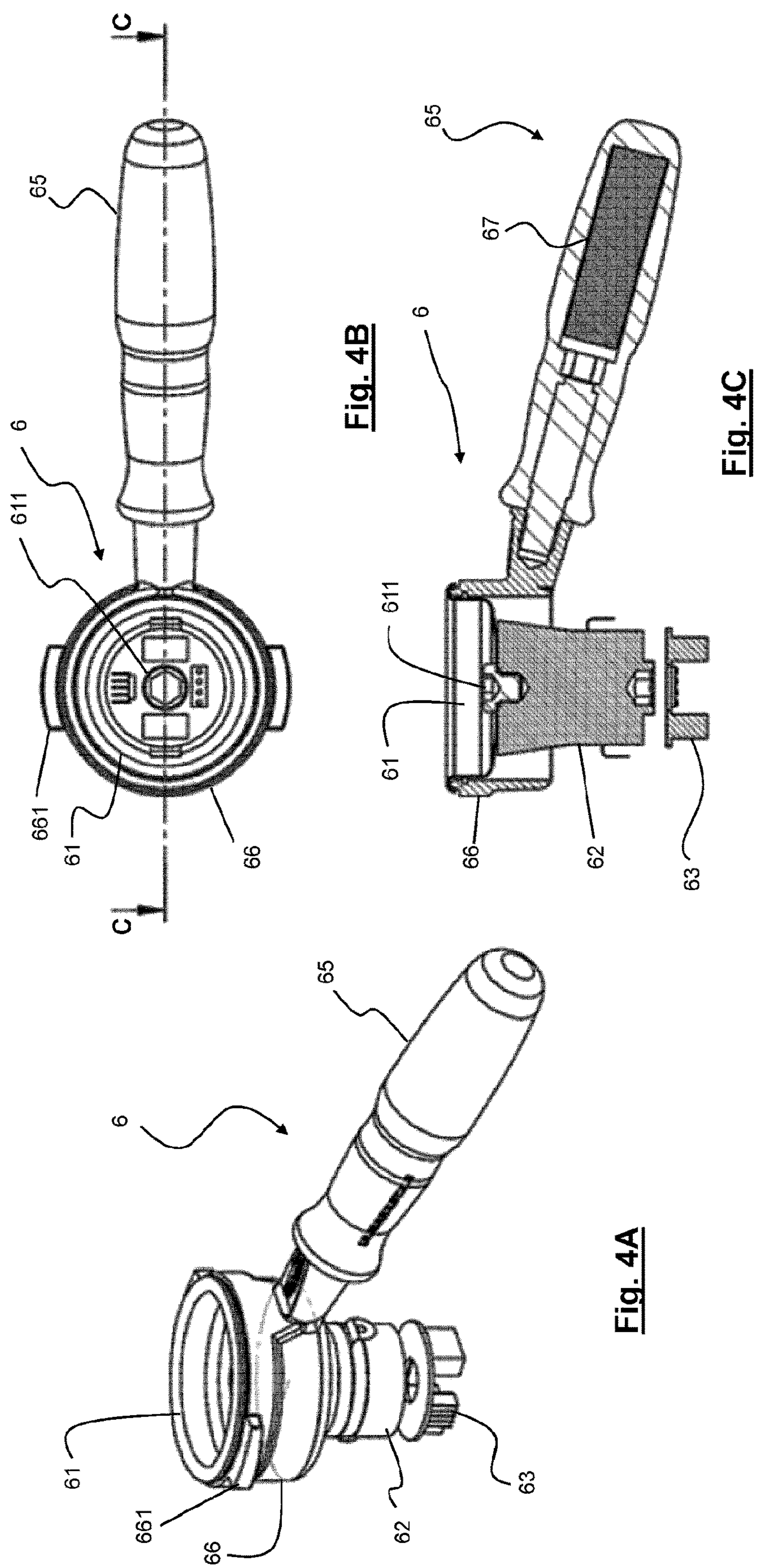
FIG. 4A is an axonometric view of the first embodiment of the ultrasonic cleaner device shown in FIG. 3.
FIG. 4B is a plan view of the cleaner device of FIG. 4A.
FIG. 4C is a cross section taken along line C-C of FIG. 4B.

FIGS. 4A-4C show an ultrasonic cleaner device 6 according to a first embodiment of the invention.

According to the present invention, there is provided an ultrasonic cleaner device 6 comprising a liquid reservoir 61, a piezoelectric transducer 62 and a generator 63. The generator 63 produces an electronic signal of high frequency and sends it to the piezoelectric transducer 62. When the piezoelectric transducer 62 receives the signal, it responds by changing shape as long as the signal is applied. The response range of the piezoelectric transducer 62 determines the frequency of the generator 63. The generator 63 transforms the electrical energy from a power source 64 into a suitable form for efficiently energizing the piezoelectric transducer 62 at the desired frequencies. The piezoelectric transducer 62 emits ultrasonic vibrations by rapidly expanding and contracting in resonance with the frequency of the generator output.

According to embodiments of the present invention, the ultrasonic cleaner device 6 is configured to be at least partially inserted into (attached to) a dispensing group 15 of the espresso coffee machine 100 in a way similar to a known portafilter, e.g., in lieu of or in place of a portafilter. Preferably, the cleaner device 6 comprises a handle 65 and a body 66 which is adapted to engage, in a releasable manner, to the lower face of a dispensing group 15. For example with a bayonet-like connection means 661. According to other embodiments, the body 66 is provided with projections 661 adapted to cooperate with guides forming at least one sliding surface for slidably supporting the cleaner device 6.

The projections 661 are in the form of ears which are arranged diametrally opposed from each other and are shaped with a decreasing thickness as shown in the Figures or with a substantially constant thickness.

The connection of the ultrasonic cleaner device 6 to the dispensing group 15 of the coffee machine 100 comprises screwing the ultrasonic cleaner device 6 to the dispensing group 15 substantially with a movement which is the same as the conventional movement for connecting a portafilter to a dispensing group. This is clear by the arrows in FIG. 2: the ultrasonic cleaner device is moved upwardly and then rotated counter-clockwise so that the projections 661 engage a proper slot in the lower part of the dispensing group.

Figures 6A, 6B, 6C:
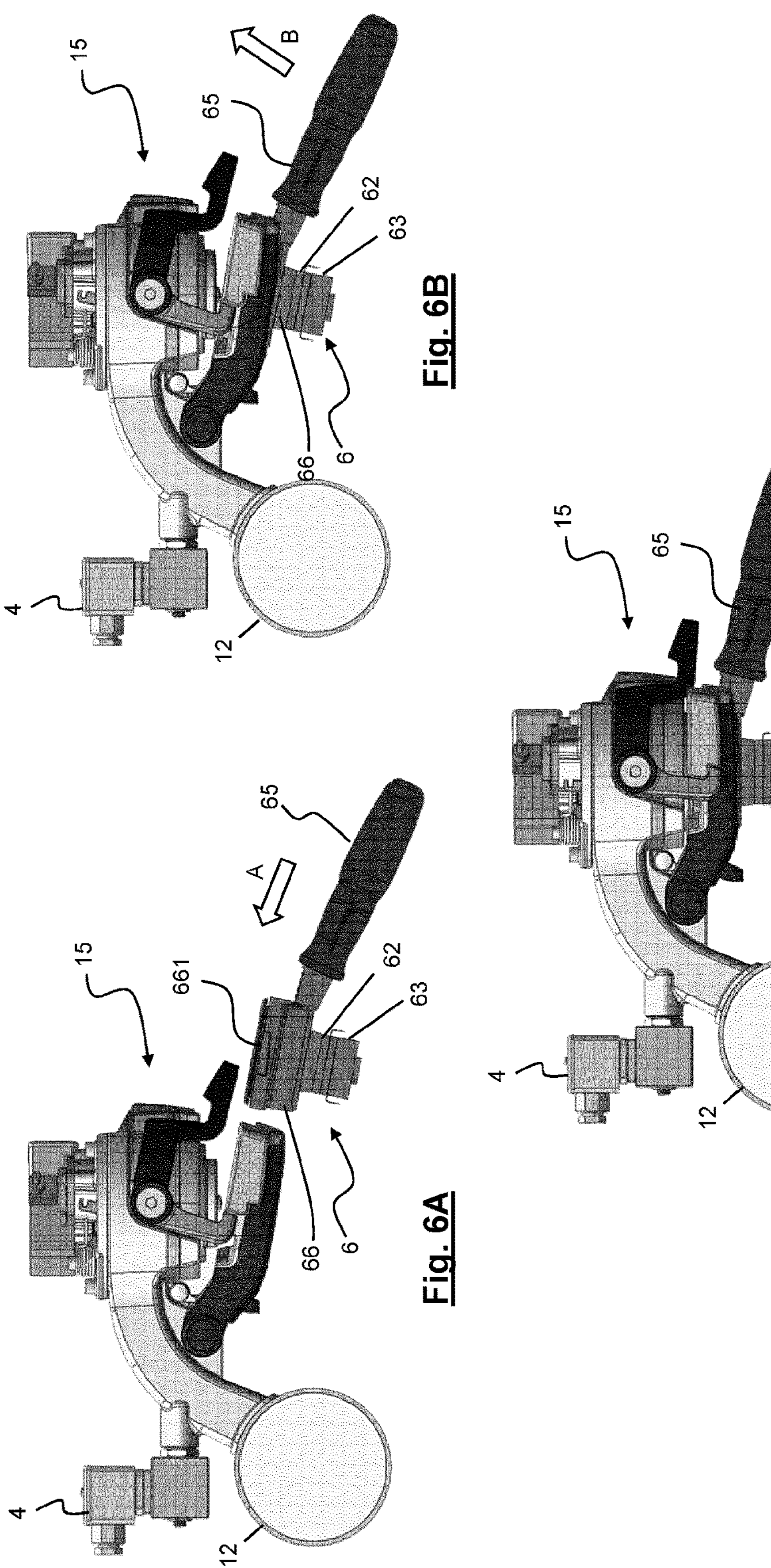
FIGS. 6A-6C show the steps of inserting the ultrasonic cleaner device of the present invention through a sliding movement along a guide.

As an alternative, if the dispensing group of the coffee machine is provided with a different arrangement for engaging with a portafilter, the ultrasonic cleaner device will be designed as the portafilter for such a different arrangement. For instance, the ultrasonic cleaner device (6) can be moved through a sliding movement along proper slides of the dispensing group. In FIG. 6A it is shown the linear movement (see arrow A) for sliding the device along the guides. In FIG. 6B, the device is partially connected and there is the need to rotate upwardly the guides with the device therein. FIG. 6C shows the engages device.

Advantageously, the ultrasonic cleaner device (6) is maintained by the barista by using the handle of the device.

Preferably, the body 66 embodies or supports a blank reservoir 61 for cleaning water. Cleaning water can be integrated with, or replaced by, a cleaning substance such as a specific (chemical) cleaning product. The reservoir can be a filter basket with no holes in the bottom. However, cleaning liquid (water) could be contained also in the brewing pipe which connects the solenoid valve 3 to the diffuser screw 31.

The reservoir 61 is connected to the transducer. For instance, the reservoir is connected to the piezoelectric transducer 62 by a screw or the like as shown in FIG. 4C. The piezoelectric transducer 62 of the device according to the present invention can be of ferrite or of a combination of metal and minerals such as quartz that produces a similar effect. However, preferably, the transducer 62 of the present invention comprises ceramic or is made of ceramic.

Preferably, the ultrasonic frequency band can be between 20 and 200 kHz. According to embodiments, it is 20-40 kHz. According to other embodiments, it is 40-70 kHz. According to other embodiments, it is 70-200 kHz for ultra fine gentle cleaning of delicate parts.

The generator and related device electronics are connected to the transducer. In the embodiments of FIGS. 4A-4C, the generator 63 and related device electronics are mounted directly to the transducer 62. This renders the cleaner device more compact.

Preferably, the power is provided by a battery 67. Preferably, the battery 67 is housed in the handle 65 as shown in FIG. 4C.

Preferably, the battery 67 is rechargeable. It could be provided a transformer with a cable and a plug-socket arrangement. As an alternative, it could be provided an induction recharge station.

Figures 5A, 5B:
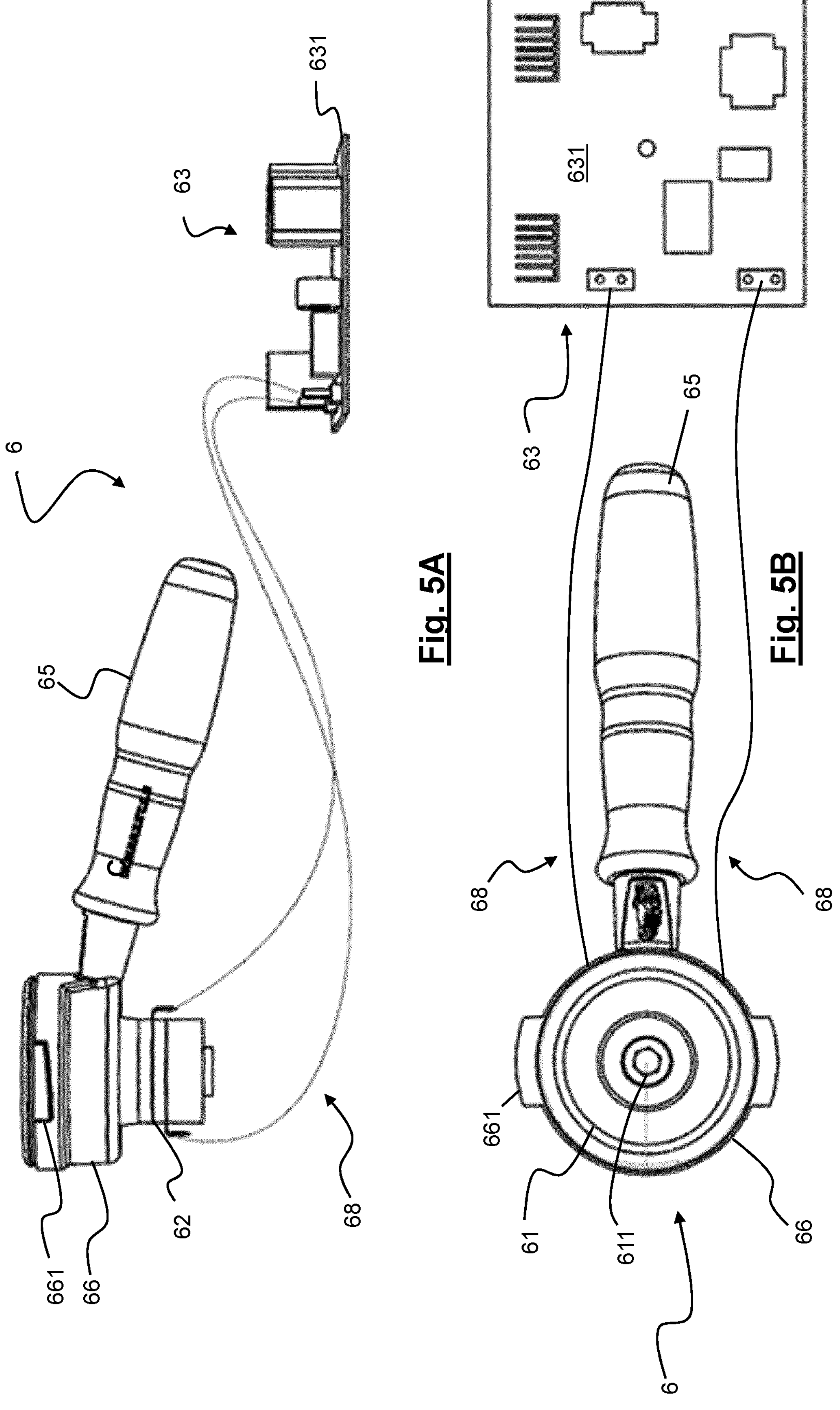
FIG. 5A is a lateral view of a second embodiment of the ultrasonic cleaner device.
FIG. 5B is a plan view of the cleaner device of FIG. 5A.

FIGS. 5A and 5B show another embodiment of the present invention in which the generator 63 and related device electronics are remote from the transducer 62.

Possibly, they are housed on a separate board 631 or in a separate housing, connected by wires 68 to the transducer 62. In embodiments, the separate board 631 or separate housing is within the main body 101 of the espresso coffee machine 100. In other embodiments, the separate board 631 or separate housing is not part of the machine 100.

The cleaning cycle of the present invention can be fully manual and carried out by the barista (or any person making maintenance of the machine). In the manual mode, the barista decides the number of cleaning cycles, the cleaning cycle sequence, the duration of the cleaning cycles and of the rest period.

As an alternative, the cleaning cycle could be fully automatic and driven, for example, by a software. In this case, the various parameters (including number of cycles, cycle sequence, duration of cleaning/rest times, . . . ) are fixed by the manufacturer and the user can not change them.

As a further alternative, the cleaning cycle could be partially manual and partially automatized.

As said above, while the present invention has been disclosed only with reference to cleaning of dispensing group parts, such as diffuser screw, shower screen, brew group, flow restrictor, solenoid valve, as well as other components that make (or can make) contact with coffee residue during the use of the espresso machine, the present invention can be used also for cleaning other parts of a coffee machine from coffee residues and/or from limescale. This could be accomplished by placing the transducer in different areas of the machine, for instance on (or close to) the coffee boiler, the steam boiler, the pump or any other component (for instance, valves).

The present invention offers further opportunities to developments of parts as they can now be cleaned in a more efficient way than with standard arrangements and products.

According to the present invention, the ultrasonic cleaning device creates a mechanical action in the liquid filled area being cleaned. The addition of ultrasonic vibration provides for an improved cleaning cycle, reduces the labor required to clean the machine, and increases the efficiency of the cleaning process. Additionally, this allows for thorough cleaning of components that are not easily accessible and the possibility of the removal of mineral buildup that would previously require disassembly and manual cleaning of the machine.

If the coffee machine is more cleaned, its efficiency is improved and espresso coffee is better. A more accurate maintenance of the coffee machine also results in a longer life of the machine.

As said above, the cleaner device of the invention is preferably inserted into (attached to) the machine in the same manner as a standard portafilter. In other words, the device is inserted into (attached to) to the coffee machine in the same manner that the operator uses to make coffee. The cleaning basket that the transducer is attached to forms a seal against the dispensing portion of the dispensing group of the machine, and allows for ultrasonic cleaning to be performed as the device and dispensing group are saturated and pressurized. This allows for thorough cleaning of the machines internal components without any disassembly required on behalf of an operator or technician.

The invention claimed is:

1. A method of cleaning a part of a coffee machine, the coffee machine comprising a dispensing group connected to receive hot water from a boiler through a valve, the dispensing group comprising components including at least a diffuser screw and a shower screen, the diffuser screw being configured to receive the hot water through a brewing pipe from the valve and to diffuse the hot water over the shower screen, the method comprising:

releasably attaching a body to a lower face of the dispensing group of the coffee machine, the body comprising two separate outwardly directed projections which are configured to releasably attach to the dispensing group, the body comprising a liquid reservoir defined within the body and a piezoelectric transducer defined within the body below the liquid reservoir, the body being attached in an interchangeable manner with a portafilter used in brewing espresso coffee, the liquid reservoir defining a cylindrical volume having a first depth in a reservoir depth direction, the piezoelectric transducer having a greater extent in the reservoir depth direction than the liquid reservoir;

loading said reservoir with a liquid;

generating an electronic signal;

sending the electronic signal to the piezoelectric transducer so that the piezoelectric transducer receives the signal and responds by changing shape and creating a mechanical action in the liquid reservoir above the piezoelectric transducer for cleaning the components of the dispensing group;

supplying power to the electronic piezoelectric transducer whereby the mechanical action in the liquid reservoir also cleans the valve.

2. The method of claim 1, wherein said attaching said body to the dispensing group of the coffee machine comprises screwing the body to the dispensing group or sliding the body into slides of the dispensing group.

3. The method of claim 2, wherein said attaching said body to the dispensing group of the coffee machine comprises hanging the body using a handle.

4. The ultrasonic cleaner device of claim 1, wherein the first depth is substantially uniform in a reservoir depth direction.

5. An ultrasonic cleaner device for an espresso coffee machine comprising:

a body configured to be at least partially and releasably attached to a lower face of a dispensing group of the espresso coffee machine in an interchangeable manner with a portafilter used in brewing of espresso coffee, wherein the dispensing group comprises components including at least a diffuser screw and a shower screen, the diffuser screw being configured to receive the hot water through a brewing pipe from the valve and to diffuse the hot water over the shower screen, wherein the body comprises two separate outwardly directed projections which are configured to connect to the dispensing group;

a liquid reservoir defined within the body and configured to contain a liquid, the liquid reservoir defining a cylindrical volume having a first depth in a reservoir depth direction;

a piezoelectric transducer defined within the body below the liquid reservoir and configured to receive an electronic signal and to respond to the electronic signal by changing shape and thereby causing the liquid above the piezoelectric transducer to clean the components of the dispensing group, the piezoelectric transducer having a greater extent in the reservoir depth direction than the liquid reservoir;

a generator configured to supply sufficient power to the electronic piezoelectric transducer whereby the mechanical action in the liquid reservoir also cleans the valve.

6. The ultrasonic cleaner device of claim 5, wherein the body comprises a handle, and wherein the outwardly directed projections are arranged symmetrically with respect to a longitudinal axis of the handle.

7. The ultrasonic cleaner device of claim 6, wherein said two separate outwardly directed projections are in the form of ears which are arranged diametrically opposed from each other and are shaped with a decreasing thickness.

8. The ultrasonic cleaner device of claim 5, wherein the two separate outwardly directed projections are configured to cooperate with a circular guide or with a linear guide at the lower face of the dispensing group.

9. The ultrasonic cleaner device of claim 5, further comprising the generator configured to generate the electronic signal.

10. The ultrasonic cleaner device of claim 9, wherein the body incorporates the liquid reservoir, the piezoelectric transducer, and the generator.

11. The ultrasonic cleaner device of claim 9, wherein the body incorporates the liquid reservoir and the piezoelectric transducer and wherein the generator is remote from said body.

12. The ultrasonic cleaner device of claim 5, wherein the body further comprises a handle and a battery housed, at least partially, in the handle.

13. The ultrasonic cleaner device of claim 5, wherein the body is configured to be attached to the lower face of the dispensing group of the espresso coffee machine in lieu of the portafilter.

14. The ultrasonic cleaner device of claim 5, wherein the body comprises a modified portafilter.

15. The ultrasonic cleaner device of claim 5, wherein the body has a same shape and an outer dimension as the portafilter used in brewing.

16. The ultrasonic cleaner device of claim 5, wherein the first depth is substantially uniform in a reservoir depth direction.

* * * * *